(12) United States Patent
Zagoneanu

(10) Patent No.: US 9,778,429 B2
(45) Date of Patent: Oct. 3, 2017

(54) HEAT SINK FOR OPTICAL MODULE ARRAY ASSEMBLY

(71) Applicant: ProPhotonix (IRL) LTD, Little Island (IE)

(72) Inventor: Adrian Zagoneanu, Bucharest (RO)

(73) Assignee: ProPhotonix (IRL) LTD (IE)

( * ) Notice: Subject to any disclaimer, the term of this patent is extended or adjusted under 35 U.S.C. 154(b) by 0 days.

(21) Appl. No.: 14/705,189

(22) Filed: May 6, 2015

(65) Prior Publication Data
US 2015/0323751 A1 Nov. 12, 2015

Related U.S. Application Data

(60) Provisional application No. 61/989,269, filed on May 6, 2014.

(51) Int. Cl.
*G02B 6/00* (2006.01)
*G02B 6/42* (2006.01)

(52) U.S. Cl.
CPC ......... *G02B 6/4269* (2013.01); *G02B 6/4204* (2013.01); *G02B 6/426* (2013.01); *G02B 6/428* (2013.01); *G02B 6/4249* (2013.01)

(58) Field of Classification Search
CPC .... G02B 6/423; G02B 6/4261; G02B 6/4257; G02B 6/426; G02B 6/4268; G02B 6/4269; G02B 6/4272; H05K 5/0213; H05K 7/20254; H05K 7/20218; H05K 7/20136; H05K 7/20
USPC .......... 385/62, 63, 83, 87, 92, 134; 361/699, 361/679.47, 678, 716
See application file for complete search history.

(56) References Cited

U.S. PATENT DOCUMENTS

| | | | |
|---|---|---|---|
| 2012/0263200 A1 | 10/2012 | Tamaya et al. | |
| 2013/0021746 A1* | 1/2013 | Campbell | H05K 7/20145 361/679.47 |
| 2014/0063740 A1* | 3/2014 | Sunaga | H01L 23/473 361/699 |

* cited by examiner

*Primary Examiner* — Kaveh C Kianni
*Assistant Examiner* — Hung Lam
(74) *Attorney, Agent, or Firm* — Pandiscio & Pandiscio

(57) ABSTRACT

Apparatus comprising: a heat sink, the heat sink comprising: a body formed out of a heat-transmissive material; at least one channel extending through the body, the at least one channel having an inlet port and an outlet port; at least one opening extending through the body, the at least one opening being configured to receive an optical module therein; at least one securement element mounted to the body for releasably securing an optical module within the at least one opening; and at least one alignment element mounted to the body for ensuring appropriate alignment of an optical module received in the at least one opening.

22 Claims, 11 Drawing Sheets

Spring plunger locking laser module in position

Heat sink array

Example of fluid flow through channels in the heat sink. The fluid can flow in the opposite direction Spring plunger locking laser module in position Electronic board used to drive laser modules mounted in the heat sink but is electrically isolated Optical modules sitting in the heat sink with the optical sources electrical pins protruding from the bottom face of the heat sink Exploded view of the heat sink invention manufactured using two metal plates

HEAT SINK FOR OPTICAL MODULE ARRAY ASSEMBLY

REFERENCE TO PENDING PRIOR PATENT APPLICATION

This patent application claims benefit of prior U.S. Provisional Patent Application Ser. No. 61/989,269, filed May 6, 2014 by ProPhotonix Limited and Adrian Zagoneanu for HEAT SINK FOR OPTICAL MODULE ARRAYS, which patent application is hereby incorporated herein by reference.

FIELD OF THE INVENTION

This invention relates to optical modules and optical module array assemblies in general, and more particularly to heat sinks for optical modules and optical modules array assemblies.

BACKGROUND OF THE INVENTION

There has been increasing demand for optical modules with higher optical output to use as light sources or for processing applications.

The operating lifetime of a light source (e.g., a laser diode) is dependent on, among other things, its operating temperature. A high quality light source, operating at 20° C., could have a lifetime in excess of 100,000 hours. However, as the optical power of the light source increases, the amount of heat generated by the light source also increases, and dissipating this heat can present significant technical challenges to the designer, particularly where the optical module is used in an optical module array assembly where a sizable number of optical modules must be packaged in a relatively confined space.

Failure of a light source is defined as the point in time when the operating current required to maintain a specified output power is increased by some percentage (e.g., 50%) of the original operating current. The output power of a light source is usually measured by a monitor photodiode integrated into the optical module which houses the light source. However, not all optical modules have monitor photodiodes incorporated therein, so the risk of the light source overheating and failing without appropriate detection is substantial.

This "excessive heat" issue is further compounded by the continuous release of new light sources with higher output powers from light source manufacturers, and the placement of high power optical modules in close proximity to each other so as to form dense arrays in optical module array assemblies.

To maximize the optical source lifetimes, and to ensure reliable operation of optical modules, it is necessary to provide adequate heat sinking for the optical module and, in particular, for the light source contained in the optical module.

However, optical modules installed in a heat sink have traditionally been difficult to remove and replace. It would, therefore, be highly beneficial to the user if a defective optical module in an optical module array assembly (having a heat sink) could be easily removed and replaced in the field by a non-technical person in a short period of time without the need for special tools.

In addition to the foregoing, optical modules require associated electronics, generally in the form of a printed circuit board (PCB), to drive the light source in the optical module. In some cases, an internal PCB is incorporated in each optical module. More commonly, however, optical modules are supplied independently of a PCB, and the optical modules are connected to an external PCB. This approach is particularly popular for optical module array assemblies. In this case, all of the optical modules of the optical module array assembly may be driven by a single external PCB. Each optical module plugs into the external PCB via the back end of the optical source of that optical module. As old optical modules become defective, replacement optical modules can simply be plugged into the existing PCB, leading to significant cost savings. The heat sink typically sits substantially parallel to the PCB, with the optical modules extending through, and mounting to, the heat sink.

It is important that the optical module plugs into the external PCB correctly. For example, when a optical module having a laser diode is mounted in a heat sink, the laser diode (within the optical module) must be correctly connected to the PCB (i.e., the positive pin of the laser diode must connect to the positive connector of the PCB, and the ground pin of the laser diode must connect to the ground connector of the PCB). Failure to do so results in malfunction of the laser diode and permanent damage to the laser diode when a voltage is applied.

Therefore, it would also be beneficial to provide a heat sink design suitable for a range of different sizes of optical module array assemblies that allows for easy replacement of defective optical modules and includes features to ensure the proper orientation of the optical modules relative to the PCB for correct electrical connection.

SUMMARY OF THE INVENTION

The present invention provides a novel heat sink for an optical module array assembly in which a defective optical module in the optical module array assembly can be easily removed and replaced in the field by a non-technical person in a short period of time without the need for special tools.

In addition, the present invention also provides a novel heat sink which is suitable for a range of different sizes of optical module array assemblies, which allows for easy replacement of defective optical modules, and which includes features to ensure proper orientation of the optical modules relative to the PCB for correct electrical connection.

In one form of the invention, there is provided apparatus comprising:
  a heat sink, said heat sink comprising:
    a body formed out of a heat-transmissive material;
    at least one channel extending through said body, said at least one channel having an inlet port and an outlet port;
    at least one opening extending through said body, said at least one opening being configured to receive an optical module therein;
    at least one securement element mounted to said body for releasably securing an optical module within said at least one opening; and
    at least one alignment element mounted to said body for ensuring appropriate alignment of an optical module received in said at least one opening.

In another form of the invention, there is provided a method for providing light, the method comprising:
  providing apparatus comprising:
  a heat sink, said heat sink comprising:
    a body formed out of a heat-transmissive material;

at least one channel extending through said body, said at least one channel having an inlet port and an outlet port;

at least one opening extending through said body, said at least one opening being configured to receive an optical module therein;

at least one securement element mounted to said body for releasably securing an optical module within said at least one opening; and at least one alignment element mounted to said body for ensuring appropriate alignment of an optical module received in said at least one opening;

positioning an optical module in said at least one opening, said at least one securement element releasably securing said optical module within said at least one opening and said at least one alignment element ensuring appropriate alignment of said optical module received in said at least one opening; and operating said optical module and passing a fluid through said at least one channel so as to draw off heat from said optical module.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Optical Modules

Figure 2:
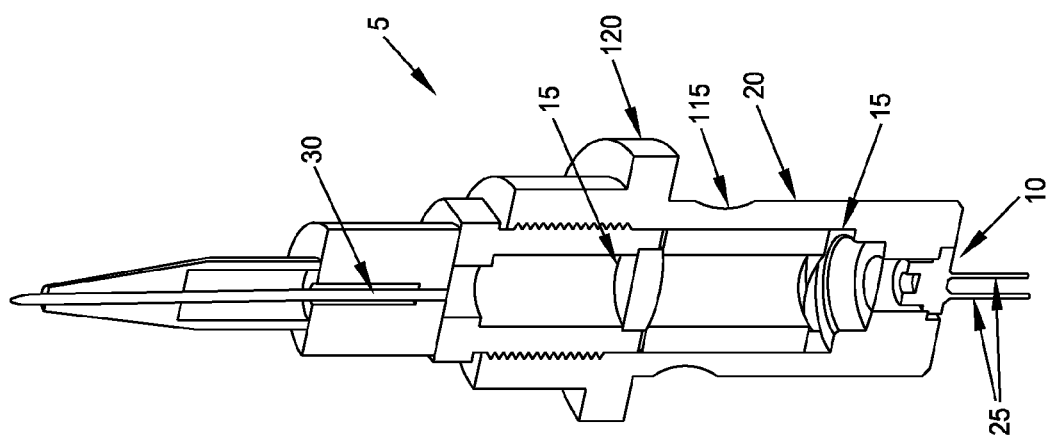
FIGS. 1 and 2 are schematic views showing an optical module formed in accordance with the present invention.
Figure 1:
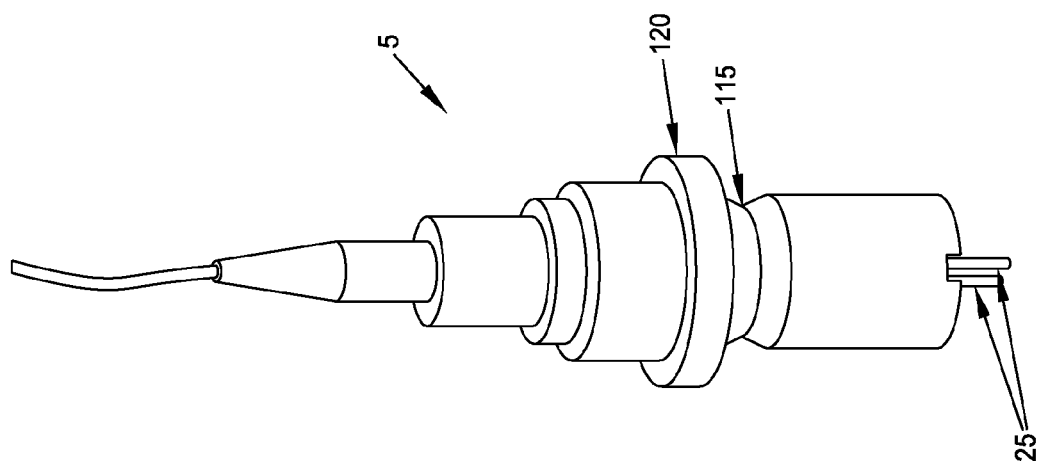

Looking first at FIGS. 1 and 2, there is shown an optical module 5 which may be used in connection with the present invention. Optical module 5 can be based on a wide variety of different light sources 10 such as laser diodes, LEDs, OLEDs, SLEDs, etc. The laser diodes can be single mode laser diodes or multimode laser diodes. The laser diodes can be edge-emitting lasers or vertical-cavity surface-emitting lasers (VCSELs). Optical modules 5 can contain more than one light source 10, for example, the optical module can contain a 2×2 array of light sources. Optical modules 5 can be any length, e.g., they can be 100 mm in length. Optical modules 5 can be any cross-sectional shape, for example, they can be cylindrical, square, or square with angled edges. In one preferred form of the invention, optical modules 5 comprise a round cross-section such as is shown in FIGS. 1 and 2. Typically, optical modules 5 range from 6 mm to 30 mm in diameter. Optical modules 5 can have fixed or adjustable focus mechanisms. Optical modules 5 typically include a light source 10, e.g., a laser diode; and a lens (or a set of lenses) 15 which typically collimate or focus the light beam emitted by light source 10. Optical modules 5 may also comprise other optical components such as diffractive optical elements, diffusers, polarizers, etc.

Optical modules 5 may not include a PCB within body 20 of optical module 5. In this case, optical module 5 is driven by an external PCB (see below) to which the optical module is electrically connected, e.g., via pins 25 of light source 10. Even where optical module 5 does not have a PCB included in body 20 of the optical module, and where optical module 5 is driven by an external PCB, the optical module generally does include some onboard electronics for driving light source 10. These onboard electronics can range from very simple electronics which simply allow for ON/OFF operation of light source 10 to more complex electronics which allow operations such as adjustable power output, Transistor-Transistor Logic (TTL) and/or real-time diagnostics. Optical module 5 can also comprise pressure equalization features, and/or purge mechanisms for removing contaminants that may enter the interior of body 20 of the optical module over time. If desired, optical module 5 can be optically fiber-coupled. Where optical module 5 is optically fiber-coupled, e.g., via an optical fiber 30, the optical fiber can be of any type, e.g., single mode, multimode, polarization mode, photonic crystal, etc.

Heat Sink

Figure 3:
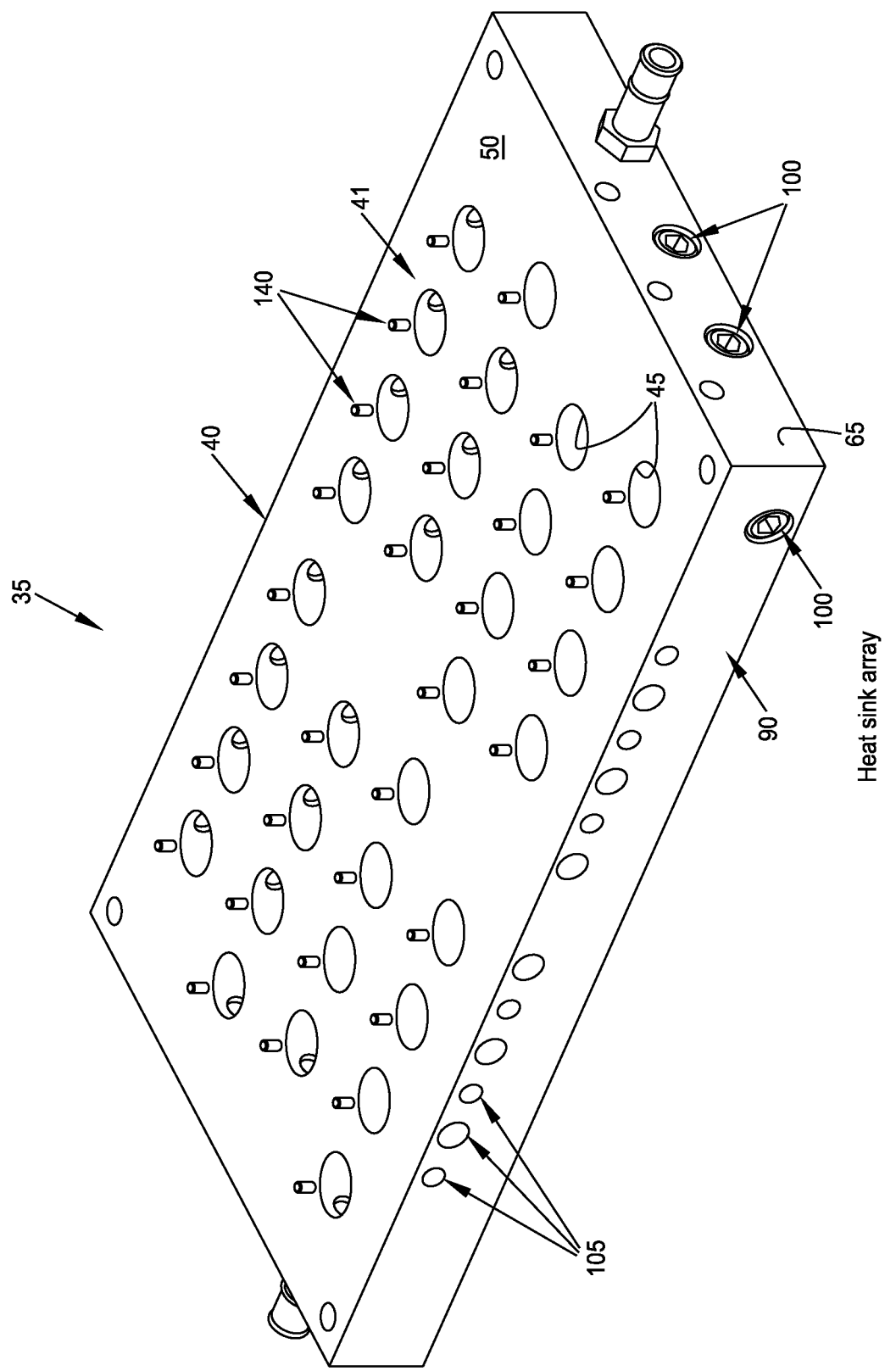
FIGS. 3 and 4 are schematic views showing a heat sink formed in accordance with the present invention.

In accordance with the present invention, and looking now at FIG. 3, there is provided a novel heat sink 35. Heat sink 35 is suitable for use with optical module array assemblies of any size, e.g., from one optical module 5 up to thousands of optical modules 5. The optical modules 5 mounted to heat sink 35 will typically be identical to one another. However, it is also possible for an optical module array assembly to comprise optical modules 5 of varying dimensions, wavelengths, functionalities and/or types and, where this is the case, heat sink 35 is configured to accommodate these varying optical modules. Heat sink 35 comprises a body 40 made of a suitable heat-transmissive material, e.g., brass, steel, aluminum, etc. In one preferred form of the invention, body 40 is manufactured from a single plate 41 formed of metal.

Optical modules 5 are mounted to heat sink 35 via openings 45 formed in body 40. Openings 45 can be arranged in 1D or 2D arrays. Openings 45 are preferably symmetrically spaced apart from one another, however, if desired, openings 45 can also be staggered or arranged in a random pattern. Openings 45 vary in size and/or taper according to the external geometry of the bodies 20 of the optical modules 5 which are to be received in heat sink 35.

Figure 8:
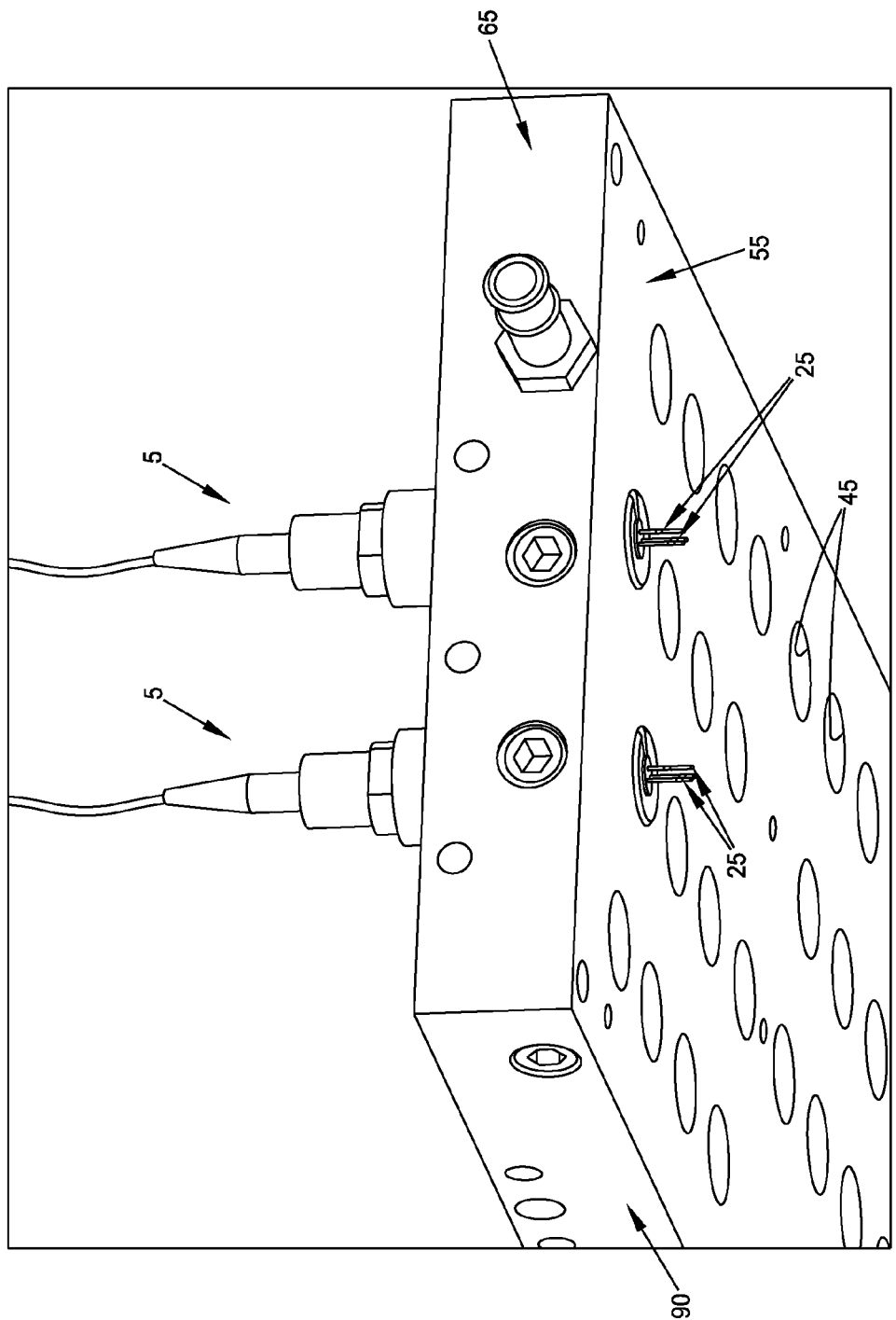
FIG. 8 is a schematic view showing the back side of a heat sink to which optical modules have been mounted.

By way of example but not limitation, a 32-channel heat sink 35 is shown in FIG. 3. In this form of the invention, body 40 is formed out of aluminum and comprises thirty-two openings 45 that extend from the top face 50 of heat sink 35 to the bottom face 55 (FIG. 8) of heat sink 35. Generally, the number of openings 45 in heat sink 35 is equal to the number of optical modules 5 which are to be provided in the optical module array assembly. In the example shown in FIG. 3, openings 45 are arranged in four rows of eight.

Serpentine Channels

In electronic systems, a heat sink is conventionally a passive heat exchanger that cools a device by dissipating heat into a surrounding medium. A heat sink transfers thermal energy from a higher temperature device (e.g., a laser diode) to a lower temperature medium, e.g., a fluid medium. The fluid medium is frequently air, but it can also be water or mixtures of fluids, e.g., a 15% ethylene glycol-water mixture.

Figure 4:
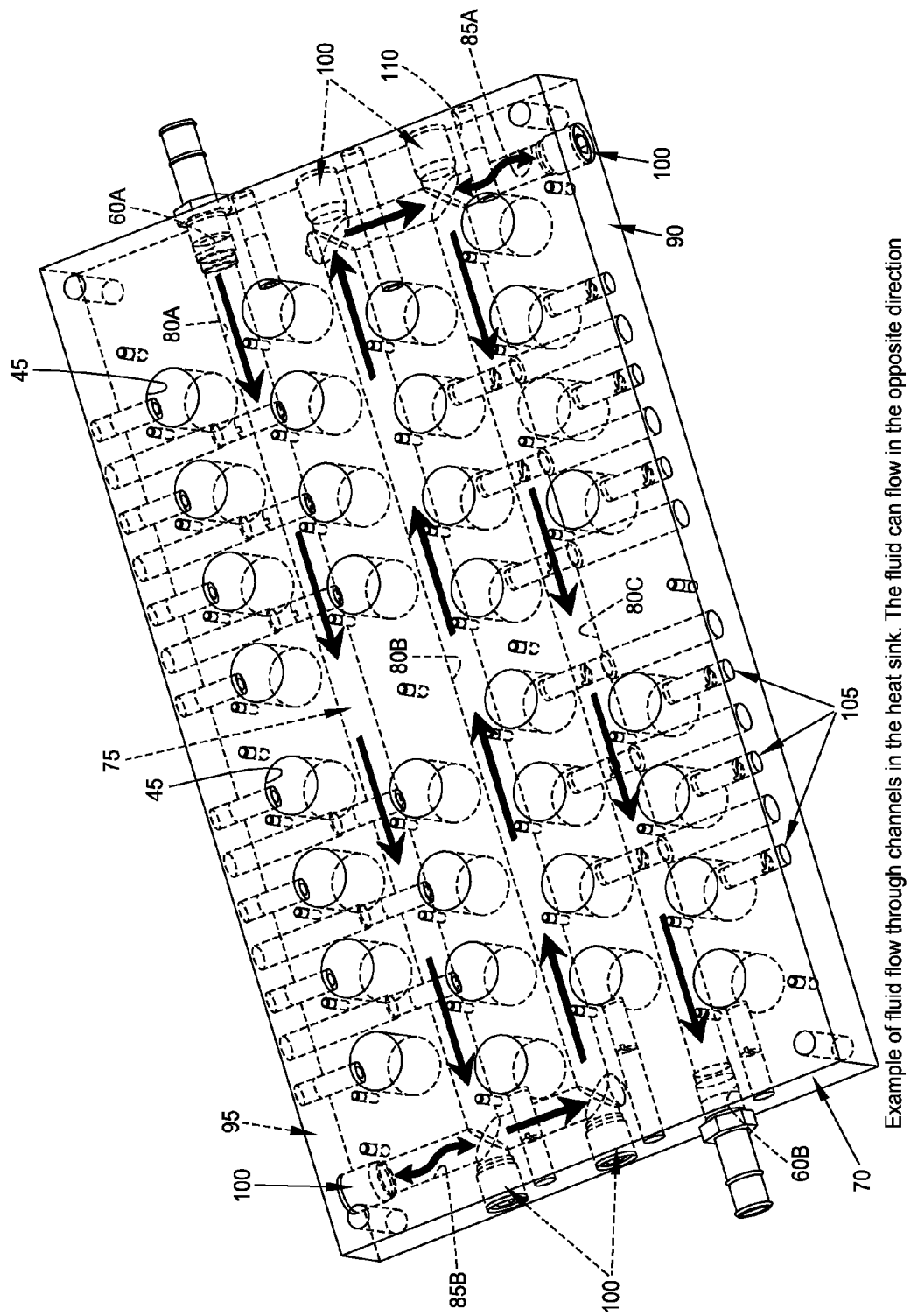

The present invention comprises a novel fluid-cooled heat sink for use in an optical module array assembly, i.e., the aforementioned heat sink 35. As seen in FIG. 4, heat sink 35 comprises two ports 60A, 60B, one of which (60A) is located at one side face 65 of heat sink 35 and the other of which (60B) is located at another, opposite side face 70 of heat sink 35. One port is an input port and the other port is an output port. The two ports 60A, 60B are preferably identical, and hence either port can be used as the input port or the output port. A cooling solution (i.e., the fluid medium) enters heat sink 35 via the input port, travels through serpentine channels 75 formed in heat sink 35, absorbs heat generated by light sources 10 so as to cool the light sources 10 contained within the optical modules 5 mounted to heat sink 35, and then exits heat sink 35 via the output port.

The serpentine channels 75 are disposed within heat sink 35 such that when optical modules 5 sit in the heat sink, serpentine channels 75 are disposed at the same "height" as light sources 10 in optical modules 5, whereby to maximize cooling of the light sources 10. In other words, serpentine channels 75 are disposed in heat sink 35 such that the cooling solution (i.e., the fluid medium) flowing within serpentine channels 75 will pass adjacent to light sources 10 disposed in optical modules 5, whereby to efficiently transfer heat from light sources 10 to the cooling medium. Thus, the "vertical alignment" of serpentine channels 75 with light sources 10 ensures that the cooling solution flowing through serpentine channels 75 flows as close as possible to the primary source of heat emanating from optical modules 5 (i.e., the light sources 10) so as to maximize cooling of the optical module array assembly.

Serpentine channels 75 can be provided in a variety of channel configurations, depending on the particulars of the optical module array assembly, e.g., depending on array type, the size of the optical modules 5 used therein, the output powers of the optical modules 5, the light sources 10 utilized in the optical modules, etc. It should also be appreciated that serpentine channels 75 can comprise varying dimensions along their length, e.g., so as to increase their surface area and/or the turbulence of the cooling solution at selected locations along serpentine channels 75. Heat sink 35 can also comprise more than one input port and/or more than one output port if desired.

FIG. 4 shows an exemplary configuration for the serpentine channels 75 of the exemplary 32-channel heat sink 35 shown in FIG. 3. For this particular design, to form serpentine channels 75 of heat sink 35, three bores 80A, 80B, 80C are drilled straight through body 40 of heat sink 35, extending from side face 65 to the opposing side face 70. In order to fluidically connect bores 80A, 80B, and 80C together, two additional bores 85A, 85B are drilled part way into body 40 of heat sink 35, preferably perpendicular to the axis of bores 80A, 80B, 80C, i.e., one bore 85A is drilled inwardly from front face 90 of heat sink 35 and one bore 85B is drilled inwardly from back face 95 of heat sink 35. For purposes of illustration, three bores 80A, 80B, 80C and two bores 85A, 85B have been shown in FIG. 4, however, it should be appreciated that more (or fewer) bores 80A, 80B, 80C may be provided and more (or fewer) bores 85A, 85B may be provided. In general, the number (and configuration) of bores 80A, 80B, 80C, etc., and the number (and configuration) of bores 85A, 85B, etc., will depend on the number of openings 45 provided in heat sink 35 and the spatial arrangement of the openings 45 provided in heat sink 35.

By placing fluid caps 100 (FIG. 4) to block off some of the exit holes of bores 80A, 80B, 80C, etc., and to block off the exit holes of bores 85A, 85B, etc., closed-loop serpentine channels 75 are provided for cooling the optical modules 5 mounted in heat sink 35. Fluid caps 100 may comprise a threaded screw with an appropriate adhesive so as to form an effective seal, or an adhesive-only barrier, or the welding or braising of a cap within the bores, etc.

It should be appreciated that it is also possible to provide the serpentine channels 75 of heat sink 35 using other methods of manufacture, e.g., casting, 3D printing, etc.

Mounting the Optical Modules to the Heat Sink

Heat sink 35 must be configured to hold optical modules 5 securely within openings 45 so as to provide good mechanical support for optical modules 5, to provide good thermal contact between optical modules 5 and heat sink 35 so as to allow for efficient thermal transfer from the optical modules to the heat sink, and to allow for easy removal and replacement of optical modules 5 when they become defective.

Figure 5:
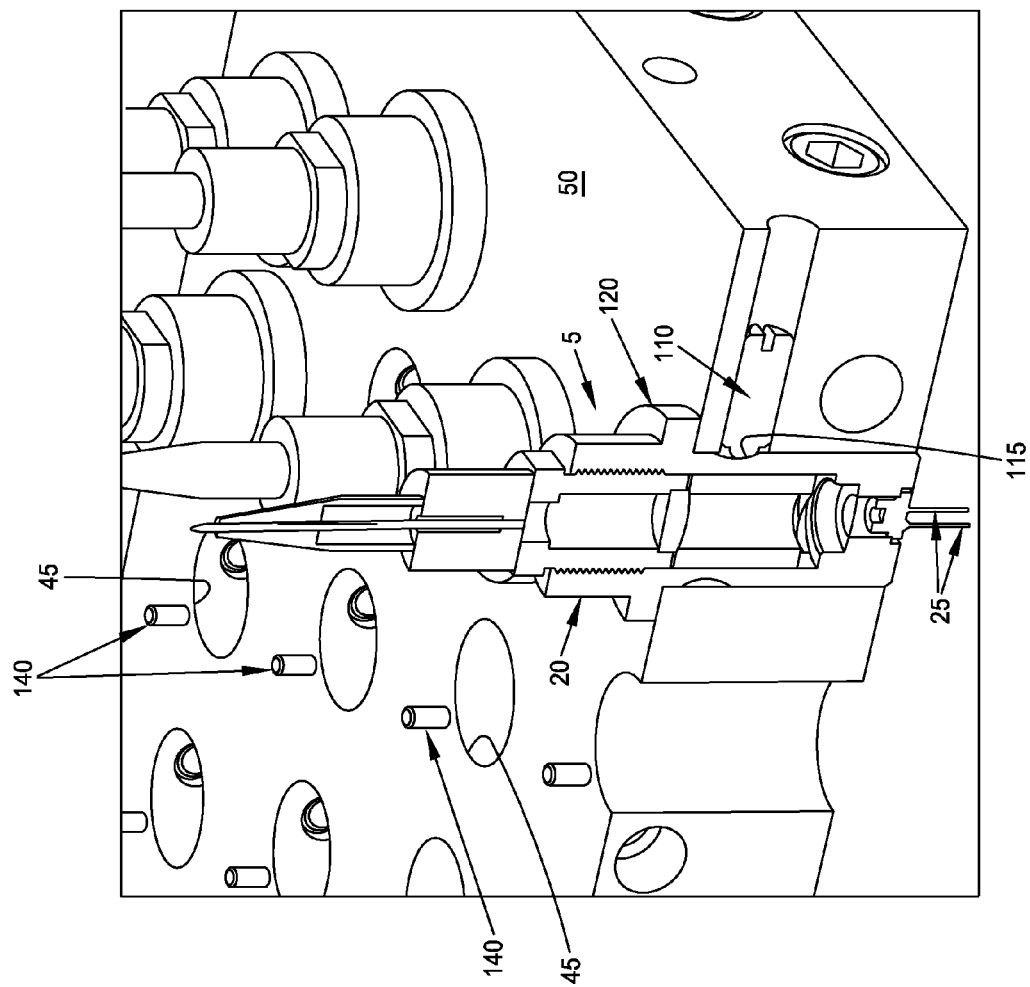
FIGS. 5 and 6 are schematic views showing the optical module of FIGS. 1 and 2 being releasably locked to the heat sink of FIGS. 3 and 4 using a spring plunger.
Figure 6:
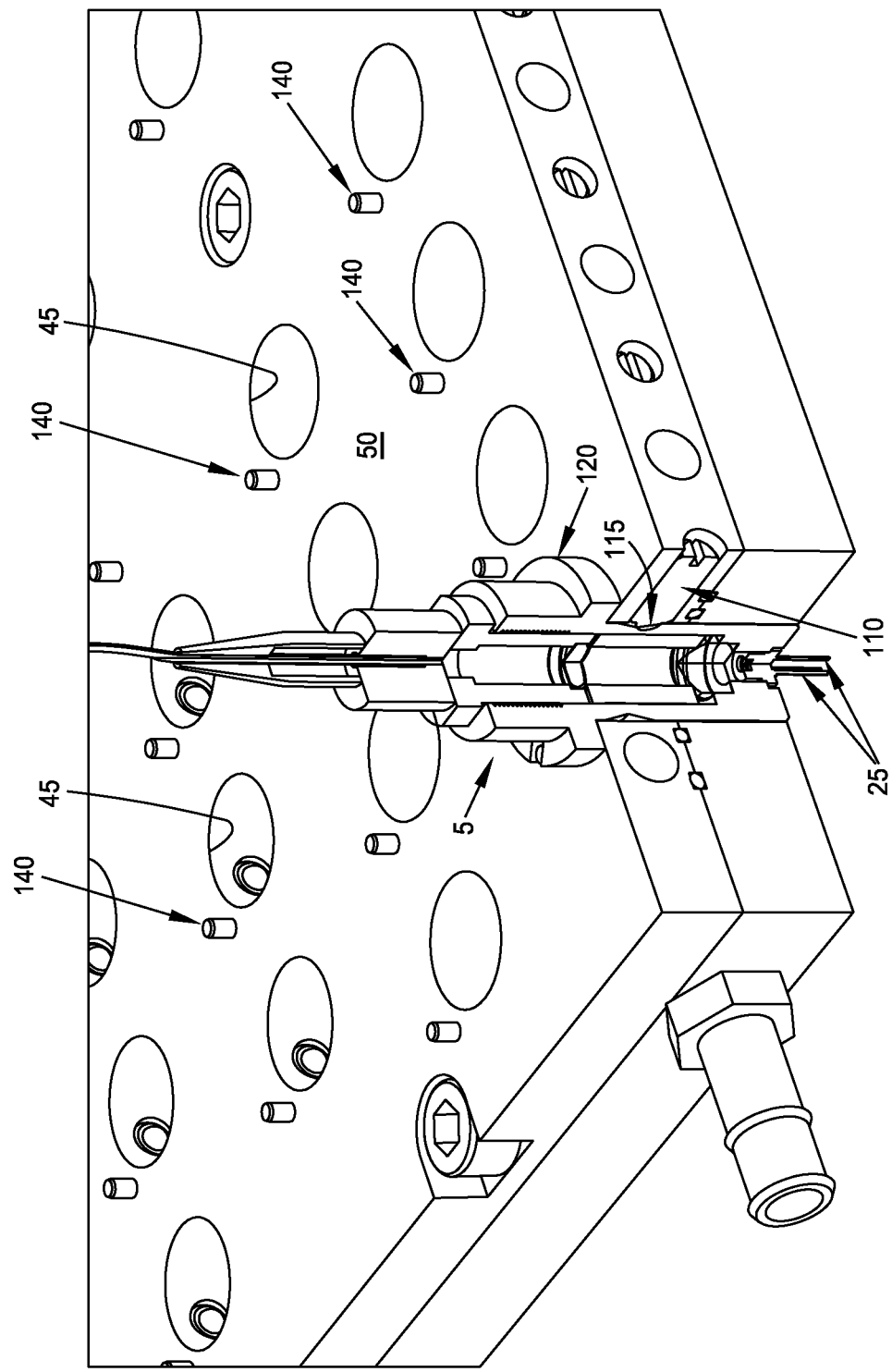

To this end, the present invention preferably comprises a corresponding hole 105 formed in heat sink 35 for every opening 45 formed in heat sink 35. See FIGS. 4-6. These holes 105 preferably extend perpendicular to the longitudinal axes of openings 45 and run from each opening 45 to either the front face 90, the rear face 95, or the side faces 65, 70 of body 40 of heat sink 35, depending on the location of openings 45 in body 40. Spring plungers 110 are disposed at the inner ends of holes 105, near their associated openings 45. Spring plungers 110 are well suited for fixturing applications where pressure is required for accurate positioning and indexing of components. With the present invention, when an optical module 5 is advanced into an opening 45 of heat sink 35 by the user, the spring plunger 110 is urged outward in its hole 105, away from the optical module 5 being inserted into opening 45. Once optical module 5 is in position in opening 45, spring plunger 110 returns to its original position (e.g., under the power of a spring) and locks the optical module in position within opening 45 (see FIGS. 5 and 6), firmly holding optical module 5 in place.

To ensure that spring plunger 110 locks optical module 5 into the correct position, optical module 5 is provided with two unique features. First, the outside surface of body 20 of optical module 5 is provided with an indent 115 (FIG. 5) at the location where spring plunger 110 contacts the optical module. Second, the outer surface of body 20 of optical module 5 comprises a lip 120 (FIG. 6) which acts as a stop as optical module 5 is inserted into opening 20, thereby ensuring that the optical module is correctly seated in the heat sink, with indents 115 aligned with spring plunger 110.

Figure 6A:
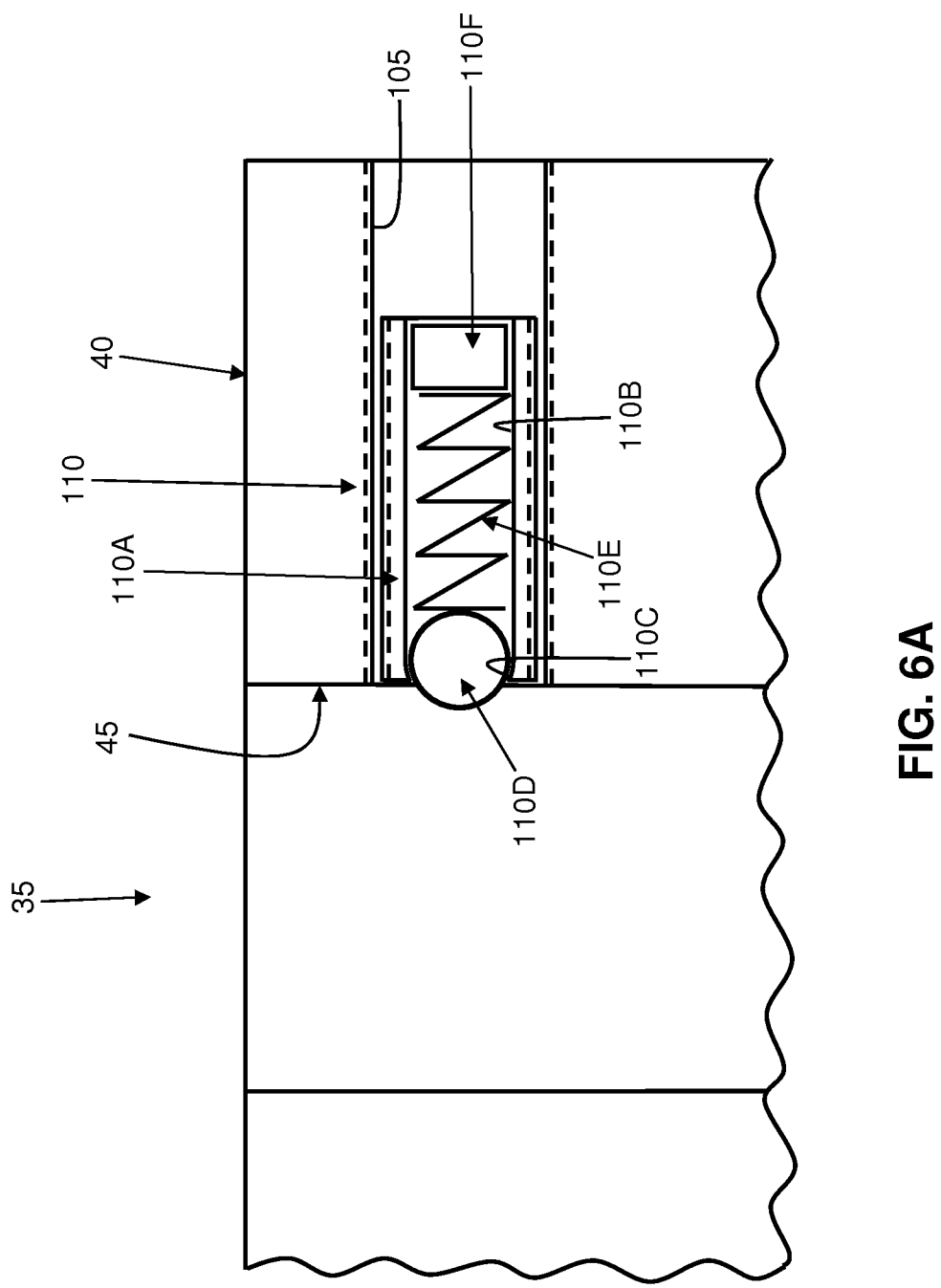
FIG. 6A is a schematic view showing further details of the spring plunger shown in FIGS. 5 and 6.

In one preferred form of the invention, and looking now at FIG. 6A, spring plunger 110 comprises a body 110A having a longitudinal bore 110B formed therein. Longitudinal bore 110B terminates in a tapered opening 110C at the distal end of body 110A. A ball 110D is positioned in longitudinal bore 110B and is sized so that ball 110D can protrude out of tapered opening 110C but cannot pass completely through tapered opening 110C. A spring 110E is disposed in longitudinal bore 110B and biases ball 110D out tapered opening 110C. An end cap 110F captures spring 110E in longitudinal bore 110B. In the preferred form of the invention, body 110A of spring plunger 110 is threaded, and holes 105 in body 40 of heat sink 35 are threaded, so that spring plunger 110 can be adjustably positioned in a hole 105, i.e., so that the spring-biased ball 110D yieldably protrudes into an opening 45 of body 40 of heat sink 35, whereby to yieldably engage an optical module 5 advanced into opening 45.

External PCB

As discussed above, in many cases, the optical modules 5 of a optical module array assembly are driven by an external PCB. In this situation, it is generally important that the PCB be kept electrically isolated from the heat sink. To this end, it is common for the PCB to be spaced a reasonable distance away from the heat sink. However, if the light sources 10 of the optical modules 5 are driven in TTL at high frequencies, the distance between the external PCB and the light sources 10 needs to be minimized so as to cut down on parasitics.

Figure 7:
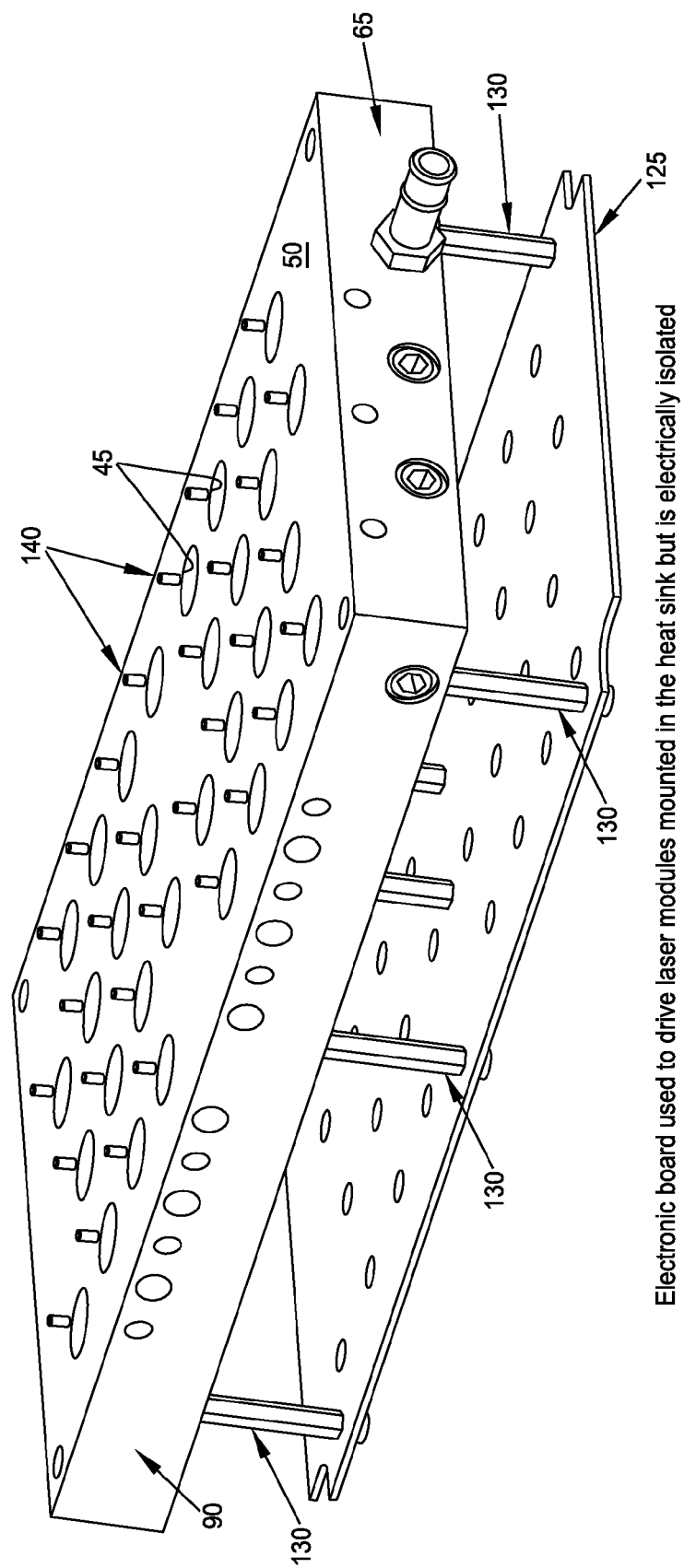
FIG. 7 is a schematic view showing a heat sink/PCB assembly.

In one preferred form of the present invention, and looking now at FIG. 7, an external PCB 125 is electrically isolated from (i.e., spaced away from), but attached to, heat sink 35 via a plurality of posts 130, e.g., four posts at each corner of the PCB/heat sink assembly and four posts spread equally across the middle of the PCB/heat sink assembly.

The height of posts 130 is set to match the back end of the optical module 5, such that the back end of the optical module (which contains the pins 25 of each light source 10) will connect directly into external PCB 125 when the optical module 5 is mounted to heat sink 35. In some cases this connection may be made via an adapter. In other configurations, the analog part of external PCB 125 may be connected directly to the light source 10 of the optical module 5 and the digital electronics will reside on external PCB 125.

It should be appreciated that the number, height and/or configuration of posts 130 can be varied so as to accommodate different sizes of heat sinks and PCBs. In addition, although one external PCB 125 is shown in FIG. 7, a plurality of external PCBs 125 could also be provided (e.g., arranged in a side-by-side configuration).

Registration Pins

It will be appreciated that, in addition to securely mounting optical module 5 in openings 45 in body 40 of heat sink 35, it is also important that the "back end" of optical module 5 (e.g., the end of optical module 5 where the laser diode is located) be correctly circumferentially orientated within a given opening 45. More particularly, the "back end" of an optical module 5 generally comprises the exposed pins 25 of light source 10 (e.g., a laser diode). See FIG. 8. Pins 25 are configured to be directly connected to (or indirectly connected to) an external PCB 125 so as to drive the various optical modules 5 in heat sink 35. When placing the optical module 5 in an opening 45 of heat sink 35, the user must generally orient the optical module 5 correctly (i.e., "circumferentially" correctly) so as to ensure that the electrical pins 25 of the light sources 10 are aligned with their counterpart connectors (e.g., positive connector and ground connector) on external PCB 125. A mistake can easily occur as the pins 25 typically appear visually identical. A further complication occurs in the field when a user mounting optical module 5 to heat sink 35 and PCB 125 may not have the training and technical knowledge necessary to ensure correct alignment of connector pins 25 to external PCB 125.

Figure 9:
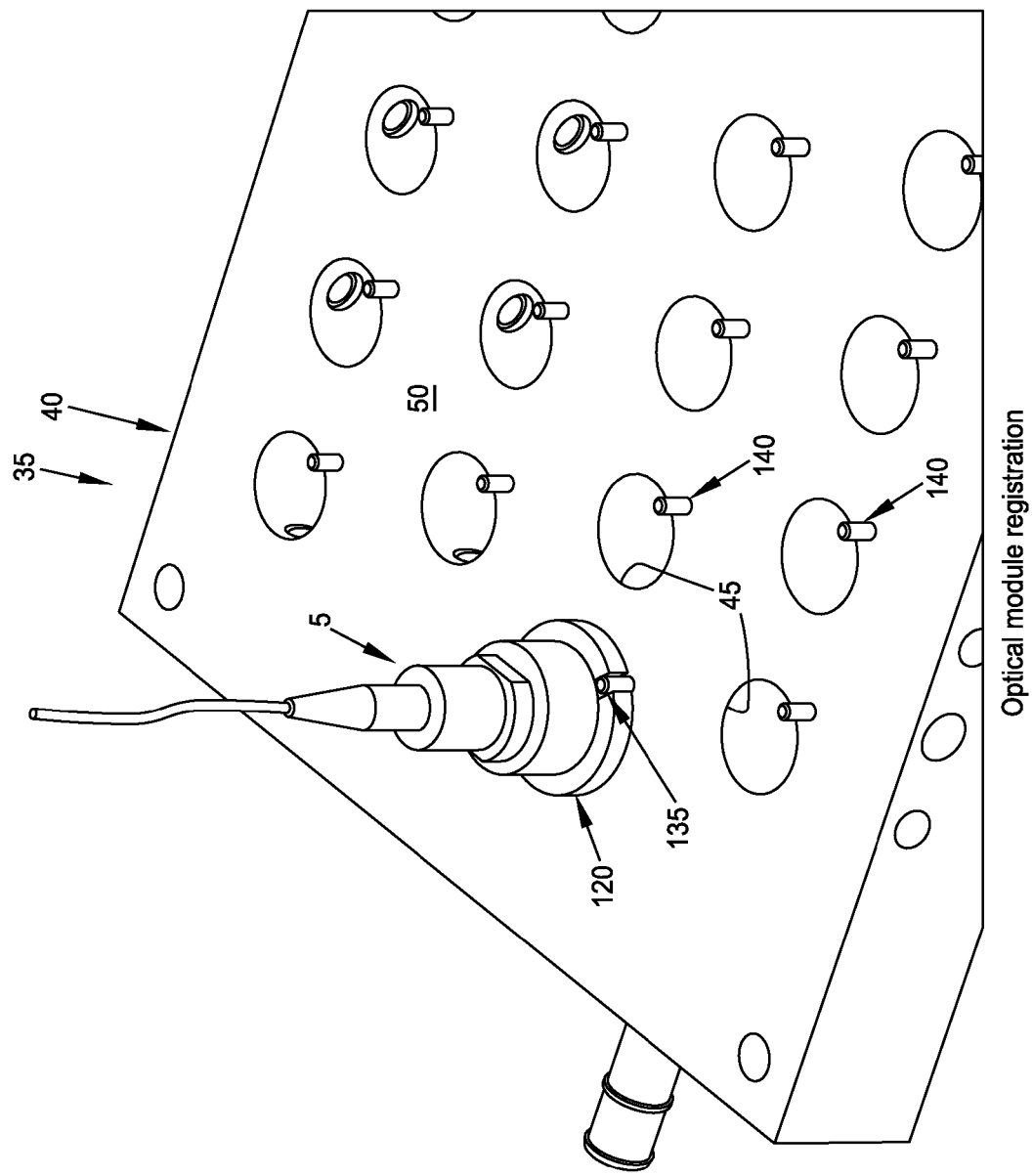
FIG. 9 is a schematic view showing the front side of a heat sink to which an optical module has been mounted.

The present invention solves this problem by combining three elements. First, the light source 10 is positioned within the optical module 5 with a specific orientation during manufacture. Second, the lip 120 of optical module 5 is formed with an indent 135 (FIG. 9). Third, the top face 50 of the body 40 of heat sink 35 comprises a registration pin 140 spatially associated with each opening 45. When placing optical module 5 into an opening 45 of heat sink 35, the optical module can only sit fully in an opening 45 if the indent 135 of lip 120 of optical module 5 is aligned with registration pin 140 associated with that opening 45, so that the registration pin 140 may be received in the indent 135. See FIG. 9. Because light source 10 has been pre-aligned relative to indent 135 of optical module 5 (i.e., during the manufacture of the optical module 5), the pins 25 of all of the optical modules 5 in the heat sink 35 will be oriented in the same way and in a predetermined fashion. This allows for light sources 10 of optical modules 5 to be correctly connected to external PCB 125 every time, even when optical modules 5 are being replaced. The user does not have to manually align the pins 25 of the optical modules 5.

Second Embodiment

Figure 10:
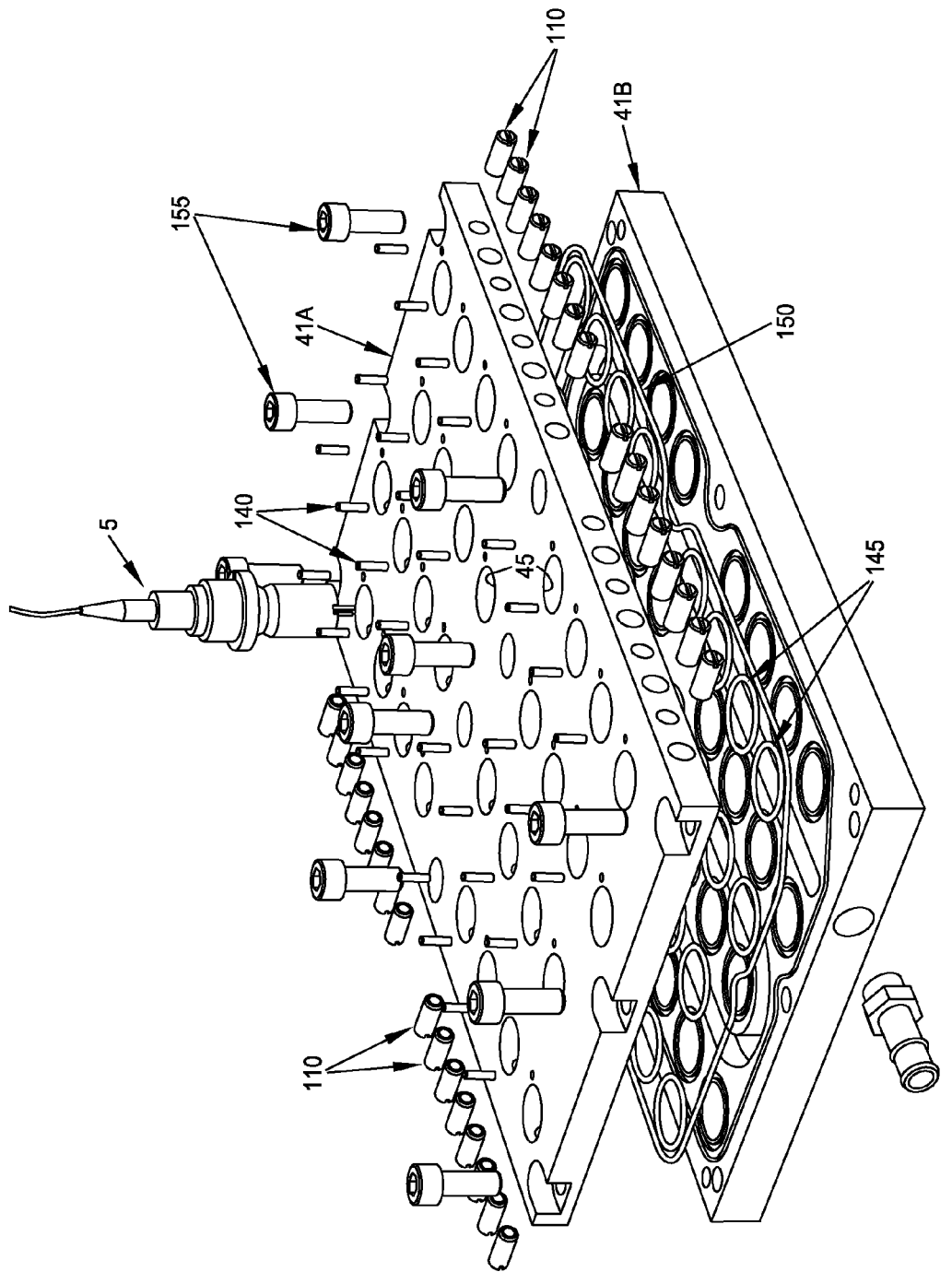
FIG. 10 is an exploded schematic view showing various aspects of a two-plate heat sink formed in accordance with the present invention.
Figure 11:
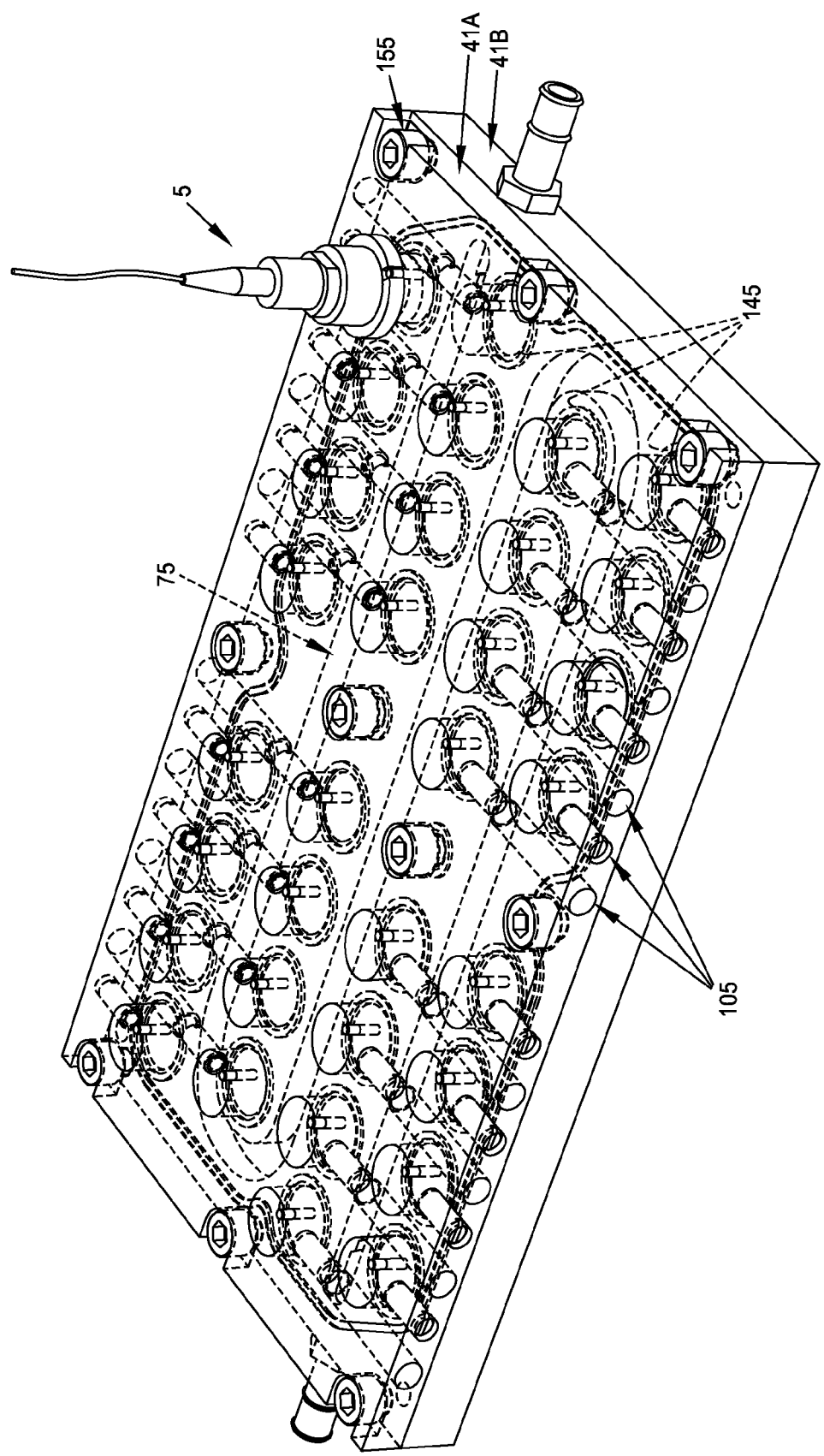
FIG. 11 is a schematic view showing additional aspects of a two-plate heat sink shown in FIG. 10.

In the constructions shown in FIGS. 3-9, body 40 of heat sink 35 is shown as being formed by a single plate 41. However, and looking now at FIGS. 10 and 11, body 40 of heat sink 35 can also be formed using two plates 41A, 41B instead of one plate 41. In this form of the invention, the spring plungers 110 for holding the optical modules 5 tightly in the heat sink 35 are preferably located in the bottom plate 41B. The registration pins 140 are located in top plate 41A. The serpentine channel 75, through which the cooling fluid travels, may be drilled out in both plates, e.g., the lower half of serpentine channel 75 may be formed in bottom plate 41B and the upper half of serpentine channel 75 is formed in top plate 41A. To ensure that the cooling fluid does not leak out of heat sink 35, individual O-rings 145 (FIG. 11) may be located around the openings 45 in the heat sink plates 41A, 41B. A further primary O-ring 150 (FIG. 10) may be located around the peripheries of the two plates, surrounding all of the optical modules 5. The two plates 41A, 41B are preferably held tightly together via a series of screws 155.

Third Embodiment

Heat sink 35 can be manufactured such that optical modules 5 are held in place by a screw (e.g., a set screw) rather than by spring plungers 110.

Alternatively, optical modules 5 may be held in place by screwing a screw directly through the lip 120 of every optical module 5 into the body 40 of heat sink 35. If desired, more than one screw can be used to secure each module 5 to body 40 of heat sink 35.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. Apparatus comprising:
   a heat sink, said heat sink comprising:
   a body formed out of a heat-transmissive material;
   at least one channel extending through said body, said at least one channel having an inlet port and an outlet port;
   at least one opening extending through said body, said at least one opening being configured to receive an optical module therein;
   at least one securement element mounted to said body for releasably securing an optical module within said at least one opening; and
   at least one alignment element mounted to said body for ensuring appropriate alignment of an optical module received in said at least one opening;
   wherein said body further comprises at least one hole intersecting said at least one opening, and further wherein said securement element is movably disposed in said at least one hole.

2. Apparatus according to claim 1 further comprising a heat-absorbing fluid flowing through said at least one channel.

3. Apparatus according to claim 1 wherein said at least one securement element comprises a spring plunger for releasably engaging an optical module disposed in said at least one opening.

4. Apparatus according to claim 1 wherein said at least one alignment element comprises a pin extending out of said body adjacent to said at least one opening.

5. Apparatus according to claim 1 further comprising an optical module.

6. Apparatus according to claim 5 wherein said optical module comprises a light source.

7. Apparatus according to claim 6 wherein said said light source comprises a laser diode.

8. Apparatus according to claim 6 wherein said light source is aligned with said at least one channel when said optical module is mounted in said at least one opening.

9. Apparatus according to claim 5 wherein said optical module comprises an indent for receiving said securement element.

10. Apparatus according to claim 5 wherein said optical module comprises a lip for acting as a stop when said optical module is inserted into said at least one opening.

11. Apparatus according to claim 10 wherein said lip receives said at least one alignment element.

12. A method for providing light, the method comprising:
    providing apparatus comprising:
    a heat sink, said heat sink comprising:
    a body formed out of a heat-transmissive material;
    at least one channel extending through said body, said at least one channel having an inlet port and an outlet port;
    at least one opening extending through said body, said at least one opening being configured to receive an optical module therein;
    at least one securement element mounted to said body for releasably securing an optical module within said at least one opening; and
    at least one alignment element mounted to said body for ensuring appropriate alignment of an optical module received in said at least one opening;
    wherein said body further comprises at least one hole intersecting said at least one opening, and further wherein said securement element is movably disposed in said at least one hole;
    positioning an optical module in said at least one opening, said at least one securement element releasably securing said optical module within said at least one opening and said at least one alignment element ensuring appropriate alignment of said optical module received in said at least one opening; and
    operating said optical module and passing a fluid through said at least one channel so as to draw off heat from said optical module.

13. A method according to claim 12 further comprising a heat-absorbing fluid flowing through said at least one channel.

14. A method according to claim 12 wherein said at least one securement element comprises a spring plunger for releasably engaging an optical module disposed in said at least one opening.

15. A method according to claim 12 wherein said at least one alignment element comprises a pin extending out of said body adjacent to said at least one opening.

16. A method according to claim 12 further comprising an optical module.

17. A method according to claim 16 wherein said optical module comprises a light source.

18. A method according to claim 17 wherein said light source comprises a laser diode.

19. A method according to claim 17 wherein said light source is aligned with said at least one channel when said optical module is mounted in said at least one opening.

20. A method according to claim 16 wherein said optical module comprises an indent for receiving said securement element.

21. A method according to claim 16 wherein said optical module comprises a lip for acting as a stop when said optical module is inserted into said at least one opening.

22. A method according to claim 21 wherein said lip receives said at least one alignment element.

* * * * *